April 16, 1929.  I. W. HENRY  1,709,814
APPARATUS FOR AND METHOD OF IONIZATION AND HYDROGENATION
OF HYDROCARBON STARTING MATERIAL, VAPOR, AND OIL
Filed Aug. 4, 1927
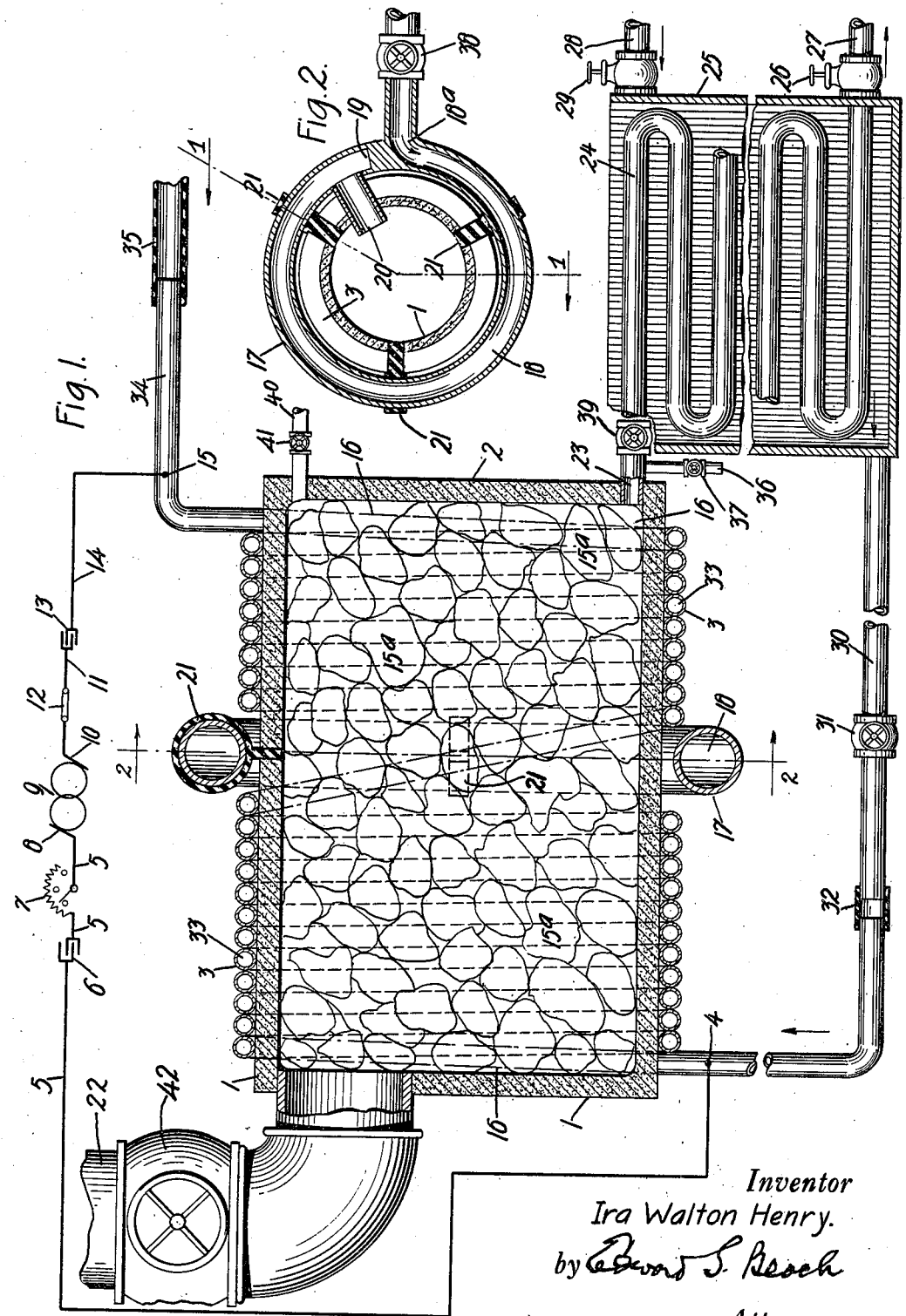
Inventor
Ira Walton Henry.
by [signature]
Attorney Patented Apr. 16, 1929.

1,709,814

UNITED STATES PATENT OFFICE.

IRA WALTON HENRY, OF GREENWICH, CONNECTICUT, ASSIGNOR TO IONIZING CORPORATION OF AMERICA, OF NEW YORK, N. Y., A CORPORATION OF NEW YORK.

APPARATUS FOR AND METHOD OF IONIZATION AND HYDROGENATION OF HYDROCARBON STARTING MATERIAL, VAPOR, AND OIL.

Application filed August 4, 1927. Serial No. 210,527.

This invention relates broadly to apparatus for ionization, hydrogenation and distillation of hydro-carbon vapor and oil. It is particularly applicable to so-called vapor-phase cracking and distillation of petroleum oils for the production of gasoline.

The object, broadly stated, of this invention is simultaneously to ionize carbon molecules in petroleum oil vapor or in petroleum oil or in suitable coal gas; generate hydrogen by dissociation of water in the presence of the ionized carbon molecules and effect chemical combination of the ionized carbon molecules with hydrogen atoms; and to energize ionization, dissociation of water and hydrogenation by use of non-depositing, electric current conducting, spaced apart chunks of material such as graphite or carbon, for examples, which serve as collectors of impurities, such as excess carbon, sulphur and sludge, and auxiliary heaters of the vapors, gas or oil treated. These chunks are distributed substantially throughout the vapor from the periphery of its volume cross-sectionally across the volume and lengthwise thereof. The material to be treated, such as petroleum oil vapor, petroleum oil or coal gas, and said heating and collecting chunks are subjected simultaneously to the action of a high frequency, oscillating, non-sparking, non-discharging, inductively established electro-magnetic field within the chamber of a receiver within which said field extends lengthwise and cross-sectionally. The water to be dissociated into hydrogen and oxygen is preferably but not necessarily introduced into the chamber and field, in the form of superheated steam. Some crude petroleum oils contain emulsified water and it is not always necessary to introduce water from an extraneous source into the receiver and field. Because of the high heat of said field, the carbon containing vapor, oil or gas to be treated has its carbon content broken up minutely into highly heated ions which are highly receptive of hydrogen atoms. The superheated steam is preferably generated in an iron generator which is heated by induction from said coil. Excess carbon; that is, more than will combine with the hydrogen, and other impurities, deposits on said heating chunks, thus cleaning the vapor of impurities; but nearly all the carbon in the vapor, gas or oil is conserved and utilized in the condensed liquid product.

I have introduced ordinary coal gas alone into said apparatus and by operating it as herein described have obtained from the coal gas a resultant vapor which on condensation in pipe 24 proved to be benzol ($C_6H_6$). Coal gas or the vapor obtained from it is a carbon containing vapor within the scope of this invention.

In the accompanying drawings, forming a part hereof and illustrating apparatus useful in practising my new method, Fig. 1 is a vertical, sectional elevation at line 1—1 of Fig. 2, of a hydrocarbon vapor or oil receiver, the chamber of which is provided with said auxiliary heating, spaced apart chunks and within which chamber said field is established by electric apparatus shown partly in diagram. The view also shows a superheated steam generator and a carbon containing vapor, condensing apparatus.

Fig. 2 is a horizontal section at line 2—2 of Fig. 1, of the superheated steam generator detached.

In the drawings, 1 indicates the top and side wall of a vertical, elongated, cross-sectionally round receiver for carbon containing vapor; such as petroleum oil vapor, petroleum oil, or coal gas. The receiver is made of non-magnetic material, such for example as baked clay, quartz, etc. Its top and bottom, the latter being indicated by 2, are closed. A hollow copper coil 3 encloses the receiver approximately from end connected at 4 to a conductor 5 connected with one side of an electric condenser 6 the other side of which is connected by the conductor with a rheostat 7 which is in electric connection with a brush 8 of an alternating current generator or dynamo 9. The other brush 10 of the generator is connected with a conductor 11 leading to a switch or fuse 12 from which the conductor leads to one side of an electric condenser 13 the other side of which is connected with a conductor 14 which is electrically connected at 15 with the lower end portion of the copper coil 3. The copper coil 3 is an electric conductor.

On passage of a high frequency, alternating current through the copper coil there is set up within the coil and within the chamber of the receiver, the electro-magnetic, heating field above mentioned. The chamber of the receiver is filled throughout its length and cross-sectionally with electric current conducting chunks 15$^a$ of graphite, carbon or other suitable material. The chunks are piled one upon the other. They are stationarily supported by the bottom and side wall of the receiver and by one another. They are irregular in form so that interspaces 16 are formed between them for flow of a hydro-carbon vapor such as petroleum oil vapor or oil, or coal gas, as the case may be. The chunks are in partial contact one with another and are partially out of contact. The reason for locating them in partial contact with one another is to prevent films of oil depositing to such an extent between the chunks as to form electric current insulation bodies.

The superheated steam generator 17 is located enclosingly of the coil. It is a hollow ring of electric current conducting metal. Its chamber is indicated by 18. One end of this chamber is open at 18$^a$ for intake of water. The end of the chamber, adjacent 18$^a$, is solidly closed by a partition 19 so that the metal in the ring is continuous.

Water, entering at 18$^a$, is converted into superheated steam which travels through the annular chamber 18 to a place near the partition 19 where the ring is provided with an inwardly projecting nozzle 20, and which extends, between turns of the copper coil 3, through the side wall of the receiver 1 into the chamber of the receiver and into said field. The generator is supported by rigid electric current insulating blocks 21 having interior portions that extend between turns of the coil 3 and are anchored in the side wall of the receiver. The chambered iron ring or superheated steam generator of iron 17 is heated inductively from said electro-magnetic field by the current thereof to a sufficiently high temperature to convert water flowing into it into superheated steam which is discharged into the chamber of the receiver about midway between the ends of said field; said chunks 15$^a$ and vapor or oil or gas to be treated being in or under the influence of said field.

The upper end of the receiver is provided with a vapor or oil intake conduit 22 for connection with any desired supply source of a hydro-carbon, such as petroleum oil vapor or petroleum oil or coal gas. The apparatus may be attached to a source of petroleum oil vapor or oil in many existing cracking plants; or to coal gas containers. Near its bottom of the receiver is provided with an outlet conduit 23 for the treated vapor, this outlet being in conduit through a valve 39 with a bent condenser pipe 24 located in a cooling water tank 25, the conduit 24 and the tank forming one well-known form of vapor-condensing apparatus. The tank is provided with a water supply pipe 28, having a regulating or shut-off valve 29, for feeding water into the tank near the upper end thereof.

The discharge end of the condenser conduit 24 is provided with an exterior, regulating or shut-off valve 26, and discharges the condensed vapor, in a liquid state, through the discharge pipe 27.

A water pipe 30 extends from the lower part of tank 25, and is provided with a shut-off or regulating valve 31. An electric, insulating conduit-coupling 32 connects the end of the water pipe 30 with the under, downwardly extending end of an end turn of the coil 3. Water from the tank flows through the chamber 33 of the coil for cooling it and is discharged exteriorly through an exit extension 34 the discharge end of which is provided with an electric, insulating conduit 35, such as rubber hose, for safety in making final disposition of the waste water. The electric, insulating conduit 32, insulates the condenser from the copper coil.

The conduit 23 is shown provided with a projecting test tube 36 provided with a valve 37. The test tube is used to determine the condition of the treated vapor which is, in all cases, a combustible vapor that may be ignited, if desired in testing, at the exit end of the tube.

According to the energy of the electric current established in said electro-magnetic field, the receiver, the electric current conducting chunks which are short-circuited secondaries, the hydro-carbon vapor, oil or coal gas, if oil or coal gas is introduced into the receiver instead of vapor, and the water introduced into the superheated steam generator can be subjected either to a low temperature, such as the steam making temperature of water (212°) Fah., an intermediate, or to a very high temperature. In fact, if it is desired, the auxiliary heating chunks 15$^a$ may be raised to a red hot temperature; and I have found that temperatures varying from 700° Fah. to 1200° Fah. greatly intensify the ionizing action of such electro-magnetic field, effect uniform and even heating of the entire volume of hydro-carbon treated, and decompose the water contained therein or contained in the steam, into hydrogen and oxygen. The steam generator being heated by induction from the hot coil 3, converts admitted water into the gaseous form of superheated steam, and the water in the steam is dissociated into hydrogen and at a temperature of 490° Fahrenheit. The hydrogen atoms unite in chemical combination with the ionized carbon molecules. The distribution of the auxiliary heating chunks throughout the vapor, oil or gas causes the same to be uniformly heated and effects uniform vaporization and increased attenuation of the vapor. Heretofore, in cracking plants, oil has not been uniformly heated. It has been cooler at its periphery than at its central portion. The result has been non-uniformity of vaporization. Uniformity of temperature throughout the volume of vapor or gas treated is obtained by this invention, not only by reason of the ionizing effect of said electro-magnetic field, but also because the chunks become heated to the same temperature as that of said field, retain such heat and serve as auxiliary heaters of the vapor.

It is important to note that by regulation of the electric current and also of the water admitted into the chamber of the steam generator 17, only as much hydrogen will be produced as is requisite for chemical combination of the carbon and hydrogen atoms, ions or molecules.

By such regulation, generation of an excess of hydrogen is easily prevented and dangerous explosions within the receiver are prevented. Prevention of such explosions is a highly important object and advantage of the present invention. The ionization of the carbon contained in the vapor treated is so effective that approximately all the carbon is conserved and utilized in the condensed liquid which flows out of the discharge pipe 27 in the form of gasoline or the like, when and if the carbon-containing vapor is petroleum vapor. If petroleum oil is introduced into said chamber and field, under a low pressure, it is instantly vaporized by the action of said field and of the highly heated chunks 15$^a$. Consequently, even though oil be introduced, it is so rapidly vaporized that this method actually involves vapor-phase cracking of oil.

If a suitable coal gas or fuel gas is to be converted into benzol by the present method, then the additional hydrogen atoms required for production of benzol ($C_6H_6$) are obtained by dissociation of the aqueous content supplied to the coal gas in the form of superheated steam.

If desired, the steam or superheated steam required can be introduced from any other suitable source than that shown, but the result of such an alternative arrangement would involve unnecessary space, labor and expense.

Each chunk 15$^a$ in said electro-magnetic field has induced in itself, from said field, an electric current and acts as a short-circuited secondary circuit; the current in said coil being the primary current. Consequently, said chunks are electric current conductors. Said chunks are non-floatable and stationary in place. They are electrically heated and retain the heat long after the current is discontinued.

As neither gasoline or its homologues nor benzol or its homologues contain oxygen, and as oxygen is evolved from decomposition or dissociation of water, it is a feature of this invention to get rid of the oxygen; and this riddance of the oxygen is accomplished by its consumption, when it strikes the hot chunks 15$^a$.

Regulation of intake valve 38 regulates the quantity of water converted into superheated steam, the aqueous content of which is subsequently decomposed. By such regulation, the quantity of steam admitted into the chamber of the receiver, within said electro-magnetic field, is easily made just sufficient for production of the requisite hydrogen atoms for chemical combination with ionized carbon molecules without the resultant deposit on said chunks or on the walls of either the ring 17 or the nozzle 20, of other than excess carbon, sulphur and, in general, sludge forming impurities.

When sludge has unduly accumulated, the introduction of material to be treated is suspended and the high frequency, oscillating current maintained, with the result of consuming and driving off the sludge in the form of smoke. During such a cleaning operation, the valve 39 is closed to prevent the smoke passing into the condenser pipe 24. The receiver is provided with a smoke pipe 40, having a shut-off valve 41 which is opened when the sludge is to be burned, the intake pipe 22 being then closed by a valve 42, as shown.

When and, if desired, the chunks 15$^a$ may be of catalytic metal, such as nickel or iron, for examples; but I find in practice that catalysts are not essential with such oils and vapors as I have treated, in consequence of the quantity of hydrogen generated within said chamber and field by decomposition of the water contained in the steam.

The purpose of the rheostat 7 is by adjustments thereof to control the heat in the receiver or still in which the starting material is treated.

The hydrocarbon vapor introduced or generated within said field, as the case may be, passes through the interspaces 16 in contact with the hot walls of the chunks 15$^a$ and practically all excess carbon and other impurities are lodged on the hot chunks which thus serve as collectors of the excess carbon and associated impurities, thus actually cleansing the vapor. Some constituents of the sludge may be vaporized by the high heat of the field and chunks but, if so, they are not found, unless negligibly, in the condensed product, whether that product is gasoline or benzol.

The constituent members of the apparatus will be disposed, in practice, to suit convenience of operation and to insure flow of the cooling water through the electric current conducting coil which, however, may be cooled by other well-known means, if so desired. I find, in practice, that when such oscillating electro-magnetic field is established, a reflex oscillation is caused in the field by a lag of current in the chunks 15ª, whether they are of carbon, graphite or any electric current conducting material; such lag being due to the fact that a short-circuited secondary current is established in each of said chunks under the conditions stated.

I also find, in practice, that when said chunks 15ª, which are hereinafter referred to as elements, are of graphite, the yield of either gasoline or benzol and of the homologues of either is substantially much larger than when said chunks or elements 15ª are of carbon or metal; and this important feature of my discovery is probably due to the fact that graphite is a better electric conductor than carbon, and is not so dense as metal. The porosities of graphite probably play an important part in substantially increasing said yield, by a very material percentage. The lag established in the chunks or elements 15ª is also important because it increases the number of oscillations in the electro-magnetic field, effecting regeneration of such field by a reflex action in the oscillations of the current between opposed points of the chunks or elements 15ª. As the current oscillations passing through the field meet the elements 15ª, the oscillations create secondary currents within the elements, thus creating lag of the oscillations and effecting a reflex current between the elements and the coil.

This method and apparatus are efficient for the cracking of hydrocarbon vapors and oils.

In the preliminary operation of warming up the apparatus, I raise the temperature of the electromagnetic field, the chunks 15ª and the metal of the steam generator, 17, to not less than 490° F. at which time the water in said generator or any water contained in the material to be treated is dissociated into hydrogen and oxygen; and ordinarily increase the energy of the electric current established in said field from 490° F. up to, in many cases, as high as 1200° F. for intensification of the breaking up of the carbon molecules, particles or atoms as thoroughly and minutely as possible. By ionized carbon molecules referred to herein, I include not only the breaking up action due to the oscillations of said field, but also to the enormously high rate of travel imparted to the component atoms or radicals resulting from what is equivalent to the electrolytic decomposition of the aqueous constituents of the water when it is dissociated into hydrogen and oxygen and also of the carbon particles.

My theory, which is justified by my actual practice, as the matter appears to me, is that the carbon particles are torn asunder and given an enormously rapid movement and that this ionization of the carbon atoms and also of the atoms of hydrogen and oxygen effected by dissociation of the water, result in what I call approximately complete ionization and hydrogenation of the carbon particles or extremely minute carbon constituents which may be electrons. At any rate, it is a fact that by the use of this apparatus in the manner described, crude oil is rapidly converted into a large percentage of gasoline; and that by making a further cut in the distillation process, benzol ($C_6H_6$) is obtained.

The chunks, 15ª, are partially separated one from another and partially in direct contact one with another as shown. Where they are partially out of contact, the interspaces, 16, for flow of oil or vapor are established. Where they are in direct contact, the oil films established between the contact surfaces are negligible as electric current insulations and the electric current induced in the chunks from the field is continuous through the chunks, 15ª, which serve as stationary heating elements of the apparatus.

What I claim is:

1. In apparatus for ionizing and hydrogenating hydrocarbon vapor and oil, the combination with a chambered receiver provided with a surrounding coil for conducting a high frequency, oscillating, electric current effective to establish by induction a high frequency, oscillating, non-sparking, non-discharging, electro-magnetic field within the coil and chamber; a superheated steam generator provided with a discharge pipe discharging into said chamber; said chamber being provided with stationary, electric current conducting, sludge collecting and vapor heating elements; in electric current conducting proximity one to another; means for regulating the quantity of superheated steam delivered into said chamber; said elements also serving as short circuited secondaries in the electric circuit whereof said coil is a primary; the superheated steam generator being effective to dissociate into hydrogen and oxygen the superheated steam.

2. In apparatus for ionizing and hydrogenating hydrocarbon vapor and oil, the combination with a chambered receiver provided with a surrounding coil for conducting a high frequency, oscillating, electric current effective to establish by induction a high frequency, oscillating, non-sparking, non-discharging, electro-magnetic field within the coil and chamber; a superheated steam generator provided with a discharge pipe discharging into said chamber; said chamber being provided with stationary, electric current conducting, sludge collecting and vapor heating graphite elements; in electric current conducting proximity one to another; means for regulating the quantity of superheated steam delivered into said chamber; said graphite elements also serving as short circuited secondaries in the electric circuit whereof said coil is a primary; the superheated steam generator being effective to dissociate hydrogen and oxygen from the aqueous content of the superheated steam.

3. In apparatus for ionizing and hydrogenating hydrocarbon vapor and oil, the combination with a chambered receiver provided with a surrounding coil for conducting a high frequency, oscillating, electric current effective to establish by induction a high frequency, oscillating, non-sparking, non-discharging, electro-magnetic field within the coil and chamber; a superheated steam generator provided with a discharge pipe discharging into said chamber; said chamber being provided with stationary, electric current conducting, sludge collecting and vapor heating elements; in electric current conducting proximity one to another; means for regulating the quantity of superheated steam delivered into said chamber; said elements also serving as short-circuited secondaries in the electric current whereof said coil is a primary; and said steam generator and elements being inductively heated from said electro-magnetic field.

4. In apparatus for ionizing and hydrogenating hydrocarbon vapor and oil, the combination with a chambered receiver provided with a surrounding coil for conducting a high frequency, oscillating, electric current effective to establish by induction a high frequency, oscillating, non-sparking, non-discharging, electro-magnetic field within the coil and chamber; a superheated steam generator provided with a discharge pipe discharging into said chamber; said chamber being provided with stationary, electric current conducting, sludge collecting and vapor heating elements; in electric current conducting proximity one to another; means for regulating the quantity of superheated steam delivered into said chamber; said elements also serving as short-circuited secondaries in the electric circuit whereof said coil is a primary; said receiver having a valved inlet pipe; a discharge conduit provided with a shut-off valve; and a valved smoke pipe.

5. In apparatus of the class described, the combination with a chambered receiver; an electric current conducting coil around the receiver; and a source of high frequency, oscillating, electric current; of a chambered steam generating and water dissociating annulus enclosing a wall of the generator and being located adjacent convolutions of said coil and provided with an exterior in-take for water, and interior solid partition dividing the chamber of the annulus into two parts; said intake being entrant into one of said parts of the chamber of the annulus and the annulus having a discharge pipe from the other part of its chamber into the chamber of the receiver; said annulus being electrically insulated from the wall of the receiver; the high frequency, oscillating, electric current through the coil establishing an oscillating, high frequency, electro-magnetic field within the chamber of the receiver, and said annulus being exposed to the heating effect of said coil and field.

6. In apparatus of the class stated, the combination with a chambered still of dielectric capacity for reception of the material to be treated; a high frequency, alternating electric current conducting coil; and, within the chamber of the still, a short-circuited, secondary forming element for effecting a high frequency, non-sparking, oscillating electromagnetic field within the coil and still chamber; and a superheated steam generator in communication with and discharging superheated steam into said field within said chamber.

7. In apparatus of the class stated, the combination with a chambered still of dielectric capacity for reception of the material to be treated; a high frequency, alternating electric current conducting coil; and, within the chamber of the still, short-circuited, secondary forming elements for effecting a high frequency, non-sparking, oscillating electro-magnetic field within the coil and still chamber; and a superheated steam generator in communication with and discharging superheated steam into said field within said chamber; said elements forming sludge collectors and said electro-magnetic field being effective for dissociating the hydrocarbon contained in the material into free hydrogen and free carbon, for electrically energizing the free hydrogen molecules and constituents of free carbon, for uniformly heating and vaporizing the dissociated hydrogen atoms and carbon constituents, and said elements also serving in co-action with said electro-magnetic field for conversion of aqueous moisture within said field into superheated steam, and for dissociating same into hydrogen and oxygen; the oxygen in such case serving to oxidize impurities.

8. In apparatus of the class stated, the combination with a chambered still of dielectric capacity for reception of hydrocarbon material to be treated; a high frequency, alternating electric current conducting coil; and, within the chamber of the still a short-circuited, secondary forming element for effecting a high frequency, non-sparking, oscillating electro-magnetic field within the coil and still chamber; and a superheated steam generator in communication with and discharging superheated steam into said field within said chamber; said superheated steam generator enclosing the still being within the induction influence of said field, when the current is on.

9. The herein described method of dissociating hydrocarbon fluids and solids, as starting material for production of gases and liquids of lighter molecular weight, consisting in subjecting hydrocarbon starting material, in partial confinement, to the action of a high frequency, oscillating, non-sparking, electromagnetic field provided with short-circuited secondary circuit forming, stationary, partially spaced apart chunks of refractory material, in electric current conducting relations one to another; and in thereby dissociating the starting material into free hydrogen and carbon vapors, within the place of partial confinement; and in simultaneously providing the still chamber and said electromagnetic field with hydrogen and oxygen both from dissociation of superheated steam.

10. The herein described method of dissociating hydrocarbon fluids and solids, such as petroleum oil, coal oil, shale oil or coal or shale, as starting material for production of gases and liquids of lighter molecular weight, consisting in dissociating the starting material into free hydrogen and free carbon in a high frequency, oscillating, non-sparking, electromagnetic field provided with stationary, sludge collecting, short-circuited, secondary forming members located in said field and being inductively energized by said field; and in simultaneously dissociating superheated steam into free hydrogen and free oxygen in the presence of the other dissociated hydrogen and the free carbon.

11. The herein described method of dissociating hydrocarbon fluids and solids, such as petroleum oil, coal oil, shale oil or coal or shale, as starting material, for production of gases and liquids of lighter molecular weight, consisting in dissociating the starting material into free hydrogen and free carbon, in a high frequency, oscillating, non-sparking, electromagnetic field provided with stationary, sludge collecting, short-circuited, secondary forming members located in said field and inductively energized by said field; and in simultaneously dissociating superheated steam into free hydrogen and free oxygen in the presence of the other dissociating hydrogen and the free carbon; and in raising the superheated steam by heat from the coacting electromagnetic field and the short-circuited secondaries located therein.

12. A method of simultaneously vaporizing and hydrogenating petroleum oil and other bituminous starting material, consisting in subjecting the starting material to the action of a high frequency, electromagnetic heating field and simultaneously therein and thereby dissociating steam into hydrogen and oxygen.

13. The method of simultaneously providing the chamber of a walled member with hydrogen, oxygen and an oily, gaseous vapor, consisting in simultaneously providing the chamber of a walled structure with hydrogen and oxygen from dissociation of an aqueous volume heated to dissociating temperature by the action of a high frequency electromagnetic field; and simultaneously bringing an oily, gaseous vapor, the hydrogen and the oxygen into contact in a high frequency electromagnetic field; and therein subjecting them to the thermal action of heat induced from said fields.

Signed at New York in the county of New York and State of New York this 27th day of July, A. D. 1927.

IRA WALTON HENRY.